United States Patent [19]

Yenzer et al.

[11] 4,297,054
[45] Oct. 27, 1981

[54] METHOD OF LAYING OFFSHORE PIPELINE FROM A REEL CARRYING VESSEL

[75] Inventors: Dennis E. Yenzer, Norco; John H. Cha, Orange; Dan Abramovich, Mission Viejo, all of Calif.

[73] Assignee: Santa Fe International Corporation, Orange, Calif.

[21] Appl. No.: 64,826

[22] Filed: Aug. 8, 1979

[51] Int. Cl.³ .......................... B63B 35/04; F16L 1/00
[52] U.S. Cl. ...................................... 405/168; 405/154
[58] Field of Search ............................. 405/154–170; 242/157.1, 54 R; 72/161, 160; 226/111, 106, 105, 112, 172, 108, 24

[56] References Cited

U.S. PATENT DOCUMENTS

| | | | |
|---|---|---|---|
| 3,331,212 | 7/1967 | Cox et al. | 405/168 |
| 3,372,461 | 3/1968 | Tesson | 405/168 X |
| 3,581,506 | 6/1971 | Howard | 405/166 |
| 3,641,778 | 2/1972 | Gibson | 405/168 |
| 3,680,342 | 8/1972 | Mott et al. | 405/168 X |
| 3,685,306 | 8/1972 | Mott | 405/168 |
| 3,722,775 | 3/1973 | Sarracino et al. | 405/168 X |
| 3,765,185 | 10/1973 | Peck et al. | 405/168 |
| 3,835,707 | 9/1974 | Rosa et al. | 405/166 X |
| 3,982,402 | 9/1976 | Lang et al. | 405/168 |
| 4,037,189 | 7/1977 | Bell et al. | 340/6 R |

*Primary Examiner*—Dennis L. Taylor
*Attorney, Agent, or Firm*—LeBlanc, Nolan, Shur & Nies

[57] ABSTRACT

Disclosed are methods and techniques related to the control of pipelaying operations from a self-propelled reel pipelaying vessel. The methods are concerned with (1) controlling pipeline geometry as a function of pipe entry angle into the water and tension on the pipeline; (2) monitoring the excursion of the pipeline outside certain defined limits and controlling the pipeline geometry based on such measured excursions; and (3) compensating for pipeline induced turning moments which would otherwise tend to draw the pipelaying vessel off course and off the predetermined pipeline right of way.

15 Claims, 5 Drawing Figures

METHOD OF LAYING OFFSHORE PIPELINE FROM A REEL CARRYING VESSEL

BACKGROUND OF THE INVENTION

This invention relates to techniques and methods utilized in laying underwater pipelines. More particularly, the invention relates to laying pipelines wherein continuous lengths of pipe are first spooled onto a reel carried by a vessel and are thereafter unspooled into the water as the vessel proceeds along the pipeline route.

The methods and techniques described herein are particularly suited for self-propelled types of reel pipe laying vessels. Suitable vessels which would be expected to use the methods and techniques described herein include drill ships and ore carriers converted to carry pipe spooling reels and related reel pipelaying equipment. One such self-propelled vessel constructed specifically as a reel-type pipe laying ship is described in the following U.S. patent applications:

U.S. Application Ser. No. 903,180, filed May 5, 1978 by Charles N. Springett, Dan Abramovich, Stanley T. Uyeda and E. John Radu;

U.S. Application Ser. No. 903,181, filed May 5, 1978 and U.S. Application Ser. No. 35,216, filed May 2, 1979 as a Continuation-in-Part of said Ser. No. 903,181, each by Stanley T. Uyeda, E. John Radu, William J. Talbot, Jr. and Norman Feldman.

The disclosures of the above-listed U.S. applications are incorporated herein in their entireties by reference as though fully set forth below.

The present application (and the inventive subject matter described and claimed herein) and the above-listed U.S. applications are all owned by Santa Fe International Corporation; hereafter the above-listed commonly owned applications will be referred to as "prior related Santa Fe applications".

Prior to the development by Santa Fe of the self-propelled reel ship known in the industry as "Apache" (the construction of which is substantially described in the above-listed prior related Santa Fe applications) and which is scheduled to begin commercial pipelaying operations in late summer of 1979, most known commercial reel type pipelaying vessels consisted of non-self-propelled barges towed by a tug. One portable pipelaying system designed and built by Santa Fe for use on small supply boat type vessels for laying small diameter pipelines (up to 4" I.D.) has been in commercial use off the coast of Australia since about July, 1978; this portable pipelaying system is described in U.S. Patent Application Ser. No. 909,260, filed May 24, 1978 by Stanley T. Uyeda and John H. Cha, and assigned to Santa Fe.

Other patents owned by Santa Fe directed to and describing one or more features of reel pipelaying vessels include:

U.S. Pat. No. 3,237,438, issued Mar. 1, 1966 to Prosper A. Tesson;

U.S. Pat. No. 3,372,461, issued Mar. 12, 1968 to Prosper A. Tesson;

U.S. Pat. No. 3,630,461, issued Dec. 28, 1971 to Daniel E. Sugasti, Larry R. Russell, and Fred W. Schaejbe;

U.S. Pat. No. 3,641,778, issued Feb. 15, 1972 to Robert G. Gibson;

U.S. Pat. No. 3,680,342, issued Aug. 1, 1972 to James D. Mott and Richard B. Feazle;

U.S. Pat. No. 3,712,100 issued Jan. 23, 1973 to Joe W. Key and Larry R. Russell; and U.S. Pat. No. 3,982,402, issued Sept. 28, 1976 to Alexander Craig Lang and Peter Alan Lunde.

SUMMARY OF THE INVENTION

The present invention is concerned with methods and techniques related to the control of pipelaying operations from a self-propelled reel pipelaying vessel. The methods are concerned with (1) controlling pipeline geometry as a function of pipe entry angle into the water and tension on the pipeline; (2) monitoring the excursion of the pipeline outside certain defined limits and controlling the pipeline geometry based on such measured excursions; and (3) compensating for pipeline induced turning moments which would otherwise tend to draw the pipelaying vessel off course and off the predetermined pipeline right of way.

The present invention is primarily applicable to a self-propelled reel pipe laying vessel, having a reel for spooling relatively inflexible pipe thereon, pipe working and handling means for straightening the pipe as it is unspooled, pipe guide means for guiding the straightened pipe into the water at a presettable, adjustable exit angle, means for maintaining the pipe under a predetermined adjustable tension, main vessel drive means, preferably including twin screws located on opposite sides of the vessel longitudinal centerline, and forward and aft thruster means located forward and aft, respectively, of the longitudinal center of the vessel.

During a pipelaying operation, the pipe handling equipment and pipe guide means translates across the beam of the vessel as it follows (or leads) the pipe wrap being unspooled. In the process of translating the pipe guide means across the beam of the vessel, turning moments (in the horizontal plane) are imparted to the vessel by the tension in the pipeline. In one aspect, therefore, the invention comprises a method of compensating for these pipeline tension induced turning moments by generating a reactive force in opposition to the pipeline tension induced turning moment to thereby correct for deviations in the vessel's course and to maintain the vessel on course along the desired right of way.

A further aspect of the method of this invention comprises monitoring the angle of entry of the pipe into the water relative to a nominal horizontal plane representing the water surface; monitoring the angle of excursion which the pipe makes relative to a nominal pipe centerline substantially parallel to the nominal preset angle of entry into the water; and adjusting the nominal pipeline tension if the monitored excursion angle remains outside a predetermined permissible excursion range for at least a significant time period, for example, greater than the pitching period of the vessel.

A still further aspect of the method of this invention comprises setting the pipe guide means to establish a desired pipe exit angle at which the pipeline substantially enters its catenary configuration before exiting the vessel and pipe guide means; and setting the tensioning means to hold the pipe under a predetermined nominal tension in conjunction with the pipe exit angle, to establish a minimum radius of curvature of the pipe in the sag bend region which is greater than the minimum radius to which that pipe may be bent without exceeding its elasticity limits as it is unspooled and paid out from the vessel.

DESCRIPTION OF PREFERRED EMBODIMENTS

Underwater pipelines for carrying oil or gas must meet certain requirements and limits set by the customer (pipeline owner) and/or governmental or other regulatory bodies. It is of primary importance that the pipe, as it is being laid and as it lays on the sea bottom, be subjected to minimal residual stress, strain, tension, etc. In terms of pipe laid by the reel method, this means that the pipe as it lays on the sea bottom must be straight and have substantially no residual curvature due to spooling or laying. It is also important that the pipeline be laid close to the nominal right of way. The "as laid" restrictions are developed as a function of a number of parameters developed by the pipeline designer, including the type of sea bed on which the pipe rests, the size and grade of pipe to be used, the type, amounts, and flow rates of fluid to be carried by the pipeline, and predicted life span of the pipeline. Other parameters relating to, or based on, the geometry (shape) of the pipeline during the pipe laying operation are developed by the pipe laying engineers.

Additionally, a reel pipelaying vessel and the pipe being laid are subjected to a number of hydrostatic and hydrodynamic forces during a pipelaying operation which must be taken into account and compensated for in order to properly lay pipe so that it meets the customer and regulatory body requirements. Such forces include the effects of wind, waves, and current on the vessel due to its heave, pitch, and roll characteristics.

Self-propelled reel pipelaying ships, including for example, Apache-type vessels described in the aforesaid "prior related Santa Fe applications", have certain distinct advantages over non-self-propelled pipelaying vessels, either of the reel pipelaying type or of the "stove piping" type; the latter technique involves joining 40 to 80 foot lengths of pipe end to end and moving the vessel ahead an equivalent distance after each such joining to thereby effectively pay out pipe from the vessel. Known commerical vessels employing the "stove pipe" technique have generally been vessels which maintain their operational position by setting out anchors. Auxiliary support vessels set out the barge anchors in specified patterns and the barge moves along the pipeline right of way by hauling in on some anchors and paying out line on other anchors. In relatively shallow water (up to about 200 feet deep), sufficient anchor line can be paid out to allow the barge to move along the right of way 1,500 to 2,500 feet before the anchors must be raised and a new pattern set. The distance which a stove piping barge can move along the right of way on a single anchor set pattern decreases as water depth increasess. It is apparent that the limited forward movement permitted by this anchor setting technique is not at all suitable for economical reel pipe laying operations.

Although towed reel pipelaying barges have been found to be quite adequate for the relatively calm waters of the Gulf of Mexico offshore of the United States coastline, they have certain inherent limitations which make then unsuitable for use in relatively rough waters, such as are found in the North Sea or off the coast of South America or Australia. One of the principal built-in limitations of a towed barge system resides in the towing connection itself. Unlike a self-propelled ship, in which the motive source is effectively connected directly and rigidly to the pipeline (through the reel), the connection between the towing vessel (motive source) and the towed barge (effectively including the pipeline end) is a flexible one which introduces an additional unpredictable and controllable factor into the overall system. In rough water, the barge may be subjected to irregular pulling action as the tow line tightens or sags with relative movement between the tug and barge. This may cause the pipeline tension to exhibit sudden increases and/or decreases in magnitude which can neither be predicted nor controlled effectively by the barge operator(s).

A self-propelled reel type pipelaying ship requires neither anchors nor tugs as the motive source. Therefore, compared to stove-piping type barges as described above, a self-propelled reel pipelaying ship is able to move continuously down the right of way, stopping only when necessary, for example, to install anodes as required by the customer and/or to perform other operations on the pipe, such as coating repair, etc. Compared to towed reel barges, the self-propelled reel ship has a significant advantage in that the motive source of the reel ship can, for practical purposes, be considered to be fixed with the reel and pipeline end, thereby eliminating relative movements therebetween due to weather related factors, as noted above.

Commercial and practical limitations effectively restrict the operating capability of a towed reel barge. One of the principal requirements in laying pipelines offshore from a surface vessel is that, in general, adequate tension must be maintained on the pipe at all significant times. This is necessary to prevent the "sag bend" from exceeding certain predetermined tolerance limits. The "sag bend" region of the pipeline occurs at or near the sea bottom where the pipe curves back to the horizontal plane as it comes to rest on the sea bottom. The point at which the pipe touches the bottom is called the Touchdown Point (TDP). It is important that the radius of the sag bend curve be kept above the minimum permissible radius to which the pipe may be bent without exceeding elasticity limits in accord with customer requirements. The pipeline should be kept under sufficient tension at all significant times during the laying operation to maintain the proper profile in the pipe between the pipe departure point from the vessel and the sea bottom on which the pipe rests, and, in particular, to prevent the sag bend radius from decreasing to below its allowable minimum.

Figure 1:
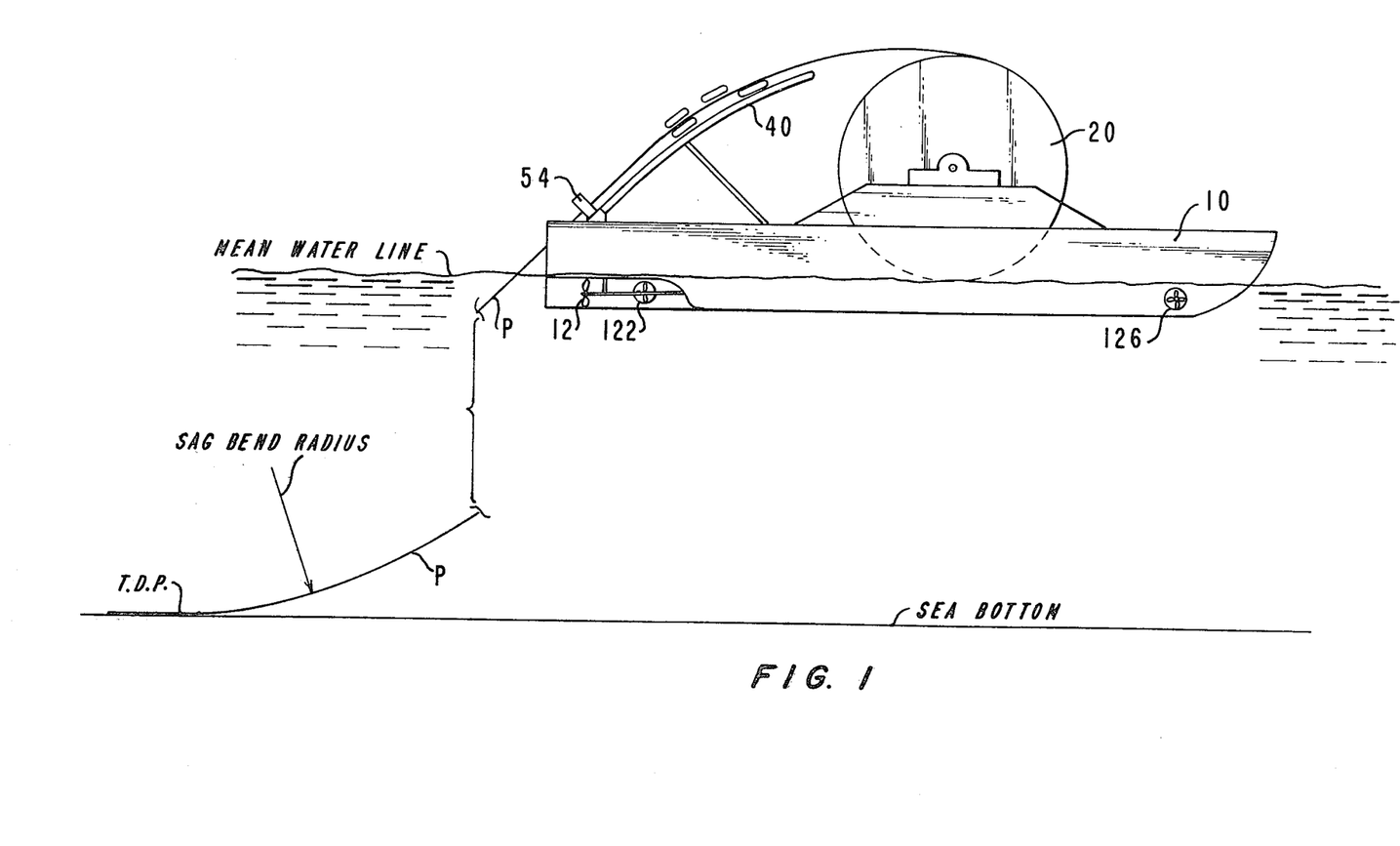
FIG. 1 is a diagrammatic sketch of a self-propelled reel pipe laying vessel showing the approximate pipe profile between the vessel and the sea bottom.

It has been found that the relationship between the departure or exit angle (also sometimes called pipe entry angle into the water) and the required tension can be expressed as an essentially linear logarithmic relation where the pipe profile is catenary-shaped in its unsupported length between the vessel and the sea bottom, substantially as represented in FIG. 1; i.e., for a given size and grade of pipe and a given lay depth along the right of way, the tension required to hold the sag bend radius above the allowable minimum decreases as the departure angle of the pipe into the water increases. For example, it is necessary to hold about 250,000 lbs. of tension (250 Kips, where "Kips" equals thousands of pounds) on a pipe having an outside diameter of 10⅜" and ¾" wall thickness laid in a water depth of 500 feet, if the pipe exit angle is set at about 26°, in order to maintain the sag bend radius above the allowable minimum; at an exit angle of 58°, the same conditions require a tension of about 60 Kips. (These examplary pipe size and water depth conditions are typical for North Sea operations.)

All known commercial reel type pipelaying barges to date have been designed to operate at a relatively fixed departure angle of between about 6° and 12° (relative to a nominal horizontal plane representing the water surface). At this shallow exit angle, the tension required to maintain a catenary shaped pipe profile for deep water (deeper than about 1,000 feet) is typically greater than can be generated by the barge and tug. The pipe therefore assumes an "∫" shape (with two inflection points) in its unsupported length between the barge and the sea bottom. The first point of inflection, or "overbend", occurs near the surface as the weight of the pipe imparts a downward force vector to the pipe, forcing it to curve downwardly; the second point of inflection occurs at the sag bend.

Referring to FIG. 1, a feature of "Apache-type" special reel pipelaying ships is the adjustable pipe carrying ramp assembly 40 pivotably mounted (generally at the stern) to the deck of the vessel 10, aft of the reel 20. The vessel also comprises main propulsion propellers 12, one or more forward lateral thrusters 126 and one or more stern lateral thrusters 122. (Throughout this disclosure, reference is made to the main propellers as providing the requisite forward thrust; it is apparent, however, that other suitable drive means could be provided to generate the necessary forward thrust and the reference to "propellers" throughout this disclosure is intended to encompass other such suitable drive means, except where otherwise specifically noted.) Special pipe handling equipment, which may include, for example, the adjustable radius control member, adjustable straightener tracks, tensioner tracks, pipe clamping assemblies, guide roller assemblies, and pipe angle measuring assembly, is advantageously mounted to the ramp assembly 40.

An adjustable ramp assembly of this type has not heretofore been incorporated into any known commercial offshore reel pipelaying vessel, specifically including the supply boat portable reel system used off the coast of Australia, the two reel pipelaying towed barges owned and used by Santa Fe and/or Santa Fe's predecessors-in-interest since about 1961 and two competitive reel pipelaying barges, one used for a short time in 1972 or 1973 and the other currently in use in the Gulf of Mexico off the United States coast.

The Apache-type reel pipelaying vessel differs from prior commercial reel pipelaying barges in its ability to discharge pipe into the water at any desired angle within its operating range of between about 15° and 65°, preferably between about 18° and 60°. The adjustable ramp assembly of an Apache-type reel ship permits the angle of entry of the pipe into the water to be preset and maintained during a pipe lay operation; the ramp assembly guides the pipe as it enters the water at the preset exit angle. As noted above, all prior known commercial reel pipelaying barges have operated at a fixed, non-variable exit angle of between about 6° and 12°. The adjustable exit angle feature of the Apache-type vessel enables it to handle a wider range of pipe sizes in a greater range of water depths than was heretofore possible with fixed low exit angle reel pipelaying barges.

One of the advantages of an Apache-type adjustable ramp assembly for setting the pipe exit angle is the virtual elimination of the overbend region (i.e., the bend region occurring as the pipe translates downwardly from the relatively horizontal plane of the barge toward the sea bed in the relatively vertical plane of the catenary). Advantageously and preferably, the ramp angle and tension are set so that downstream of the straightener/tensioner apparatus, the pipe will be unsupported; thus, pipe exiting the straightener mechanism and traveling along the ramp assembly will already be in its nominal catenary configuration before and as it enters the water. Preferably, as the pipe moves through the straightener mechanism toward the water, all or substantially all of the curvature imparted to the pipe by the reel and other pipe handling elements is removed so that pipe exiting from the straightener mechanism has substantially zero residual stress and zero residual bending moments.

By initially setting the ramp angle and nominal pipeline tension to virtually eliminate the overbend as a factor in determining and controlling the final residual pipeline characteristics, the sag bend (i.e., the bend occurring in the translation of the pipe from the vertical to the horizontal plane on the sea bottom) becomes a critical factor in the control of the pipe as it is laid. The sag bend is controlled, at least in part, as a function of the tension maintained on the pipe by the functional elements of the pipelaying vessel, including the reel, straightener/tensioner elements vessel drive assembly, etc. Controlled tension is imparted to the pipe by (1) the reel through the reel drive mechanism operating as a dynamic brake, (2) the main vessel drive thrust acting through the vessel main propellers and/or the lateral thruster assemblies, and (3) the tensioner assembly, which may or may not be used, through a regulated tensioning force established at the beginning of a lay operation and generally maintained throughout the lay operation.

The desired pipelaying tension and the desired entry angle of the pipe into the water are preferably determined on the basis of information supplied by the pipeline designer. Such information from the pipeline designer (or customer—pipeline owner) includes (1) the size of the pipe, including internal pipe diameter and wall thickness, (2) the type or grade of pipe, including such information as the pipe material and minimum yield strength, (3) maximum allowable stress, strain and residual tension, and (4) water depth along the pipeline right of way. An optimum nominal tension and lay angle can be determined from these parameters.

One of the criteria which has been developed for laying pipe with an Apache-type vessel is that the maximum allowable working stress, due the to pipelaying operation, in the unsupported length of pipe between the vessel and the sea bottom should not be greater than about 85% of the minimum yield strength of the pipe. It is also desirable and preferable to minimize the tension imparted to the pipe by the vessel while maintaining operating conditions such that the maximum allowable stress limit and the maximum allowable residual tension in the pipeline are not exceeded. This may be accomplished by setting the ramp assembly angle (and thus the pipe entry angle into the water) in conjunction with nominal pipe tension such that the tightest sag bend radius will be achieved without exceeding the above-noted stress and residual tension limit.

The ramp assembly angle (and thus the pipe entry angle into the water) is set at the beginning of the pipe-laying operation and is normally not changed during the entire lay operation. It is possible to alter the ramp angle during a pipelaying operation, for example, to account for (appreciable) changes in water depth. During the pipe-laying operation, control of the pipe as it is being laid is maintained by controlling the tension in the pipe. Such control is normally achieved through adjustments in the reel torque and/or tensioner setting and/or in the vessel forward and/or lateral thrust.

Prior to the start of the pipelaying operation, the ramp angle and nominal pipe tension level are established on the basis of input from the pipeline designer. Also, in the case of an Apache-type vessel wherein the straightener tracks and the radius controller section are independently adjustable relative to each other, the radius controller and the straighteners are set at predetermined positions relative to each other and to the ramp assembly aft of the straighteners so that the (preferably unsupported length of) pipe between the straightener assembly and aft end of the ramp assembly (at the stern guide roller assembly) will have little or no residual strain between the straightener assembly exit point and the aft end of the ramp assembly.

Under certain operating conditions, the "flexible" towing connection between a reel barge and its tug will not be adequate to maintain the necessary continuous tension on the pipeline as it is being laid. The tug moves independently of the barge due to wave action. This means that the motive source which provides the forward thrust necessary to maintain tension on the pipeline is susceptible to uncontrolled variations relative to the barge and thus to the pipe. Limited excursions of this type may be acceptable for some sizes of pipe and some sea conditions. However, the range of permitted excursions is relatively small and decreases, particularly with increasing pipe size and increasingly rough sea conditions.

A self-propelled reel ship has the advantage that the forward thrust producing motive force can be considered to be coupled directly to the pipe end on board the ship so that relative movement between the motive source and the pipe end connected to the vessel is reduced essentially to zero. Further, external forces produced by waves, winds, current, etc. act on the pipe and motive source together and at the same time. Since the motive source and pipe end are substantially directly coupled, the pipe is more directly responsive and more rapidly responsive to changes in thrust. The self-propelled ship can therefore operate in a greater range of sea conditions, and particularly adverse sea conditions, than can a towed barge.

On a reel pipelaying vessel, it is not possible to measure the pipeline tension directly. There are, however, several ways to measure the tension indirectly. One such way is to measure the forward thrust of the vessel, which is directly proportional to the tension on the pipe. Increasing or decreasing the vessel thrust will produce a corresponding proportional increase or decrease in the tension on the pipeline. This can be done by measuring the main propeller shaft torque or by measuring the force on a thrust bearing against which the propeller shaft acts.

A second method is to measure the drive motor force acting on the reel. Neglecting the components of tension produced primarily by the straightener assembly (and tensioner, when used), the force exerted by the reel drive motors is directly proportional to the tension in the pipe; thus, an increase or decrease in the drive motor force produces a corresponding increase or decrease in the pipeline tension. The reel motor drive force may be measured by, e.g., load cells between the motor/reel mechanical connection.

A third practical way to measure pipeline tension is based on measurement of the exit angle of the pipe from the vessel. It is advantageous and preferable that the pipe angle be measured with respect both to the horizon and to the ramp angle; the latter measurement is particularly helpful where the pipe passes through an exit window defined by a stern guide roller assembly, such as is used on Apache-type vessels.

Figure 2A:
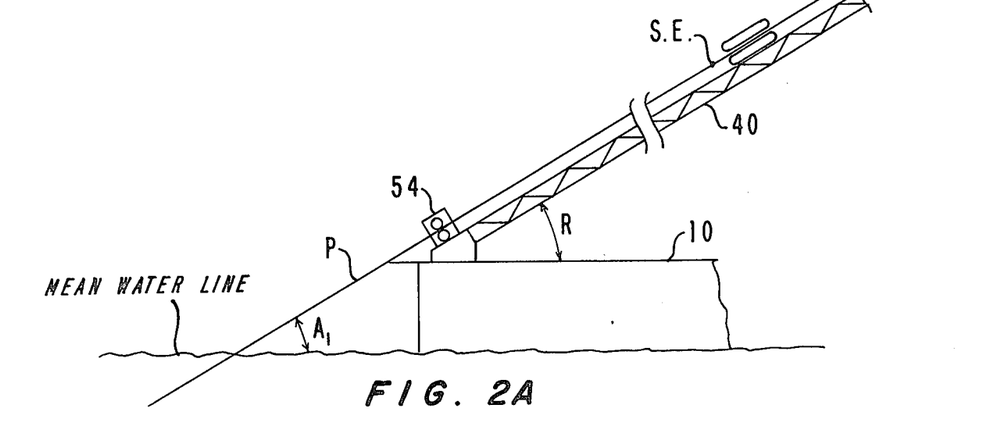
FIGS. 2A–C are diagrammatic sketches of the vessel deck, ramp assembly and pipe, in several conditions of pitching due to sea conditions.
Figure 2B:
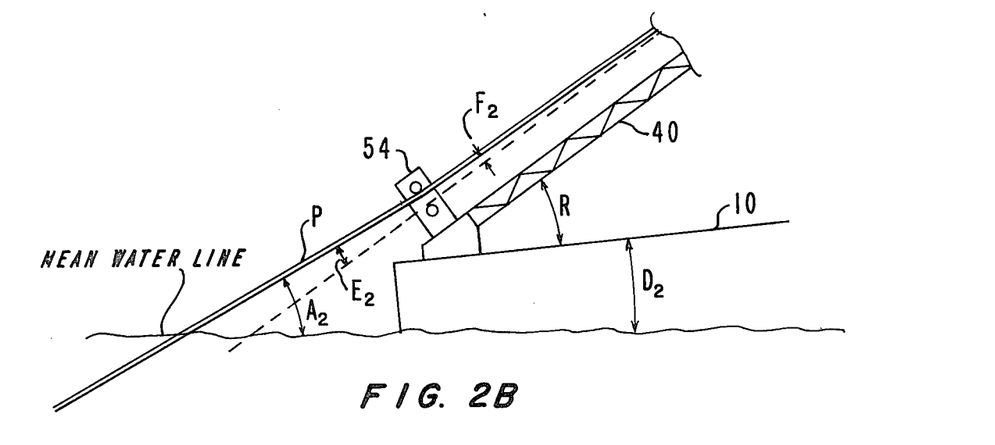
Figure 2C:
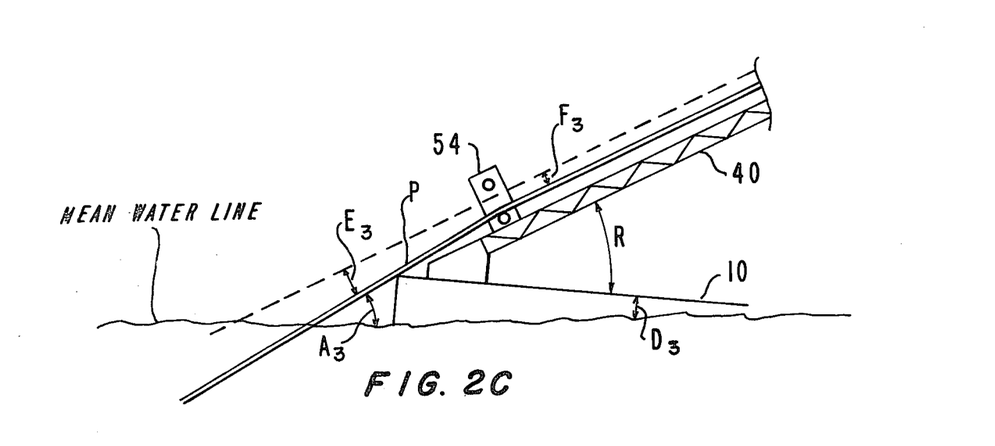

FIGS. 2A–C are diagrammatic representations of the pipelaying vessel 10, ramp assembly 40 (set at a nominal lay angle of about 30 degrees), the stern guide roller assembly 54 defining the exit window, and the pipe P. FIG. 2A shows the relationship between the ramp assembly and the pipe when the vessel is substantially flat in the water so that the entry angle $A_1$ of the pipe into the water (relative to a nominal horizontal plane or axis, such as the horizon) is substantially the same as the predetermined ramp angle R; FIG. 2B shows the same relationship when the vessel is pitched bow up at an angle $D_2$ and the pipe $P_2$ enters the water at an angle $A_2$; and FIG. 2C shows the same relationship when the vessel is pitched bow down at an angle $D_3$ and pipe $P_3$ enters the water at an angle $A_3$. The exit point of the pipe from the straightener/tensioner assembly is designated by reference SE. The pipe is essentially in fixed relation to the ramp assembly and the vessel at point SE. Preferably and advantageously, sufficient and adequate tension is maintained on the pipe P during the laying operation so that the pipe travels in a path substantially parallel to the ramp and through the guide roller assembly 54 substantially unsupported between straightener exit SE and the touchdown point TDP on the sea bottom. Also advantageously and preferably control of pipelaying operation is maintained so that angles $A_1$, $A_2$, $A_3$ will be essentially equal.

The stern guide roller assembly provides a pipe excursion window between the upper and lower guide rollers for pipe excursion relative to the vessel as a result of vessel motion due to wave action. In one commercial embodiment, the distance between the straightener exit SE and stern guide roller assembly 54 is approximately 45 feet; the distance between the upper and lower stern guide rollers is approximately four feet. This permits an angular excursion of the pipe between straightener exit SE and stern guide roller assembly 54 in a range from about 4.7° for 4 inch OD pipe to about 3.2° for 18 inch OD pipe; that is, the pipe can move through this range without being subject to bending moments by the stern guide rollers. Referring to FIGS. 2B and 2C, angles $F_2$ and $F_3$, respectively, represent the excursion above and below the nominal centerline of the pipeline P when it is tensioned to be parallel to the plane of the ramp assembly 40.

During the pipelaying operation, the vessel moves forward through the water as a function of the thrust generated by the main vessel drive, reacting against pipe tensioning forces produced by the pipe handling equipment, including reel dynamic braking forces, straightener, tensioner, etc. Changes in or modifications to the rate of forward motion of the vessel, and thus the rate at which pipe is unspooled from the reel 20 and paid out into the water, may be controlled by adjusting the dynamic braking force exerted by the reel drive mechanism and/or the amount of thrust generated by the main propellers. A typical lay rate, i.e., the rate at which pipe is paid out from the vessel during a lay operation, would be in the range of 75-150 feet per minute. It has been found to be preferable to maintain the forward thrust relatively constant and to control pipe tension changes through adjustments to the reel dynamic braking force. Due to the large mass of the reel and pipe, it is not possible to effect instantaneous changes in the pay out rate.

As the vessel pitches during a laying operation, the stern, with the ramp and other related pipe handling equipment, moves up and down in the water. The pipe, paid out from the straightener exit SE at predetermined rate which, as noted, cannot be changed instantaneously, also moves up and down with the vessel. The pipe is subjected to inertial effects through its underwater suspended length and on-bottom friction. Due to such inertial effects on the pipe, the portion of the pipe downstream of straightener exit SE does not necessarily move with the vessel so that the total pipe excursion relative to the ramp may be greater than the stern guide excursion window limits. Under conditions where the bow pitches up by an angle $D_2$, the pipe may be bent around the upper stern guide roller, as shown in FIG. 2B. Similarly, when the bow of the vessel pitches downwards by an angle $D_3$, the pipe may be bent around the lower stern guide roller assembly, as shown in FIG. 2C.

In a commercial embodiment of an Apache-type vessel, an angle measuring device measures the pipe angle downstream of the stern guide assembly relative to the ramp assembly 40 and relative to the horizon. One such angle measuring device is shown and described in aforesaid British Application Ser. No. 7915914. An apparatus for this purpose is manufactured by Interstate Electronics, Inc.

In FIG. 2B, reference $E_2$ represents the measured angle of excursion of the pipe $P_2$ relative to the ramp assembly 40 under the condition where the vessel pitches up by the bow at an angle $D_2$. At this pitch angle, the effective exit angle $G_2$ becomes R (ramp angle) plus $D_2$ (pitch angle). As noted earlier, it has been found that pipe tension and exit angle are inversely proportional; therefore, as the effective exit angle $G_2$ increases, the tension applied to the pipeline should be decreased in order to maintain the pipe profile within acceptable limits. However, since, due to reel and pipe inertia and other factors, the tension applied to the pipe cannot be adjusted to directly follow the pitching of the vessel, the effective tension on the pipe is increased and a pipe profile such as shown in FIG. 2B results. Under sufficiently severe conditions of vessel pitch, the pipe $P_2$ undergoes a relatively large excursion so that the pipe excursion angle $E_2$ exceeds the guide assembly window excursion limit angle $F_2$. In such cases, the pipe undergoes a bending moment about the upper stern guide roller. If this binding moment exceeds the elastic limit of the pipe, the pipe will undergo plastic bending and will thus retain a residual curvature due to such plastic bending when it rests on the bottom.

When the bow of the vessel pitches downward, e.g., at an angle $D_3$, a pipe profile such as shown in FIG. 2C may result. In this case, the effective exit angle $G_3$ becomes R (ramp angle) minus $D_3$ (pitch angle); in this case, the effective exit angle is smaller than the nominal preset ramp angle. In order to maintain a proper pipe profile, in bow down pitch condition, the tension on the pipe should be increased an amount sufficient to compensate for the decrease in effective exit angle. However, for reasons noted above, it is not possible to instantaneously change the tension imparted to the pipe by the vessel, and particularly by the reel. Therefore, the pipe undergoes an excursion $E_3$ which may be greater than the excursion $F_3$ permitted by the stern guide window limits. Under such conditions, the pipe undergoes a bending moment about the lower stern guide roller; if this bending moment exceeds the elastic limit, the pipe undergoes plastic bending and will retain a residual curvature when it is laid.

The angle measuring device measures excursion $E_2$ and $E_3$ to thereby generate an indication of excessive bending of the pipe on the ramp. Measurement of excursion $E_2$ or $E_3$ is particularly important as an indicator that the pipe is over-tensioned or undertensioned, irrespective of the pitching of the vessel. When the vessel is pitching, excursions $E_2$ and $E_3$ would be expected to be relatively short-lived. Measurement of such short-lived excursions would not provide an accurate indication of over- or under-tensioning.

A continuous measurement of excursion $E_2$ greater than limit $F_2$, or measured excursions $E_2$ greater than $F_2$ which occur a significant percent of the time (e.g., greater than the pitching period of the vessel), even though such excursions are not continuous, indicate to the operator that the pipe is being held under excessive tension. The operator can then adjust the reel dynamic braking force to decrease the tension on the pipe until the angle measuring device measures an excursion $E_2$ less than excursion $F_2$, neglecting short-lived excursions due to vessel pitching. Correspondingly, when the angle measuring device measures an excursion $E_3$ continuously greater than excursion limit $F_3$, or greater than $F_3$ a significant percent of the time (e.g., greater than the pitching period of the vessel), even though not continuous, these constitute indications that the pipe is being held under insufficient tension. The operator can then increase the tension on the pipe until the measured excursion $E_3$ becomes less than excursion limit $F_3$, again neglecting short-lived excursions due to vessel pitching.

When the vessel is pitching, due, for example, to sea conditions, measuring excursions $E_2$ and $E_3$ may produce erroneous indications of pipe tension and may make it difficult, if not practically impossible, for the operator to maintain proper tension on the pipe. Therefore, the angle measuring device also measures the actual exit angle A of the pipe (relative to the horizon or mean water line). Such measurement provides a more accurate indication of the actual pipe entry angle into the water so that under varying sea conditions, with the vessel pitching continuously, the operator can maintain a direct reading of the actual pipe entry angle. The operator is then able to maintain the proper reel dynamic breaking force and provide necessary compensation adjustments based on the actual pipe angle relative to the fixed horizon, as distinguished from angles measured relative to the moving and pitching vessel.

The pipe laying operation is also affected by the fact that the pipe traverses across the beam of the vessel as it is unspooled. This produces a turning moment tending to pull the vessel off course. This turning moment increases to a maximum at the end of transverse travel of the ramp assembly, decreases to zero when the ramp assembly (and pipeline path) is aligned with the vessel centerline, and increases to a maximum in the opposite direction as the ramp assembly continues moving to the extreme opposite end of its transverse travel.

The turning moment can be quite large compared to the forward thrust generated by the main propellers. For example, in one commercial embodiment, the ramp assembly has an athwartship movement range of 21.5 feet. The shafts of the main propellers are located about 20 feet to either side of the vessel centerline; each produces a maximum thrust of 80 Kips. When pipe is being laid under 100 Kips tension at an exit angle of 30 degrees, the pipe tension induced turning moment at each extreme end of ramp assembly travel is on the order of 930 foot Kips. The opposing turning moment produced by the main propeller on that side operating at maximum thrust is about 1,600 foot Kips. It will be seen that the pipe tension induced turning moment may well be a significant percentage (58.9% in the example given here) of the drive induced turning moment. If the pipe tension induced turning moment is not compensated for, the vessel will be pulled off course; this can result in the pipe being laid out of the right way, which is commercially unacceptable.

The pipeline induced turning moment must be compensated for in order to lay the pipe in a straight line along the right of way. With twin screw vessels, that is, vessels propelled by two sets of main drive propellers equally spaced on opposite sides of the longitudinal centerline of the vessel, it may be possible to overcome the turning moment introduced by the pipe's pipeline offset relative to the vessel center line by increasing thrust on the propeller located on that side of the vessel and/or decreasing thrust on the opposite side main drive propeller. This has certain inherent disadvantages because the pipeline induced turning moment continually varies as the pipeline shifts laterally across the vessel as it is unspooled.

To compensate for this varying turning moment using the main drive propellers requires that the thrust of the drive propellers be varied accordingly, while at the same time taking into account that the forward component of thrust must be maintained relatively constant in order to maintain the proper amount of tension on the pipe at all pertinent times during the pipe-laying operation. Under certain conditions of pipeline tension and forward thrust, the system will not be able to generate sufficient additional thrust to compensate for the pipeline induced turning moment, especially when the ramp assembly and pipeline are at an extreme end of transverse displacement.

A second and potentially more commercially preferable way to compensate for the turning moment introduced by the pipeline lateral travel comprises utilizing forward and aft lateral thrusters. Examples of such thrusters are shown in the aforesaid prior related Santa Fe applications. Also, referring to FIG. 3 hereof, an aft thruster tunnel 120 houses the aft thruster 122; a forward thruster tunnel 124 houses the forward thruster 126.

Figure 3:
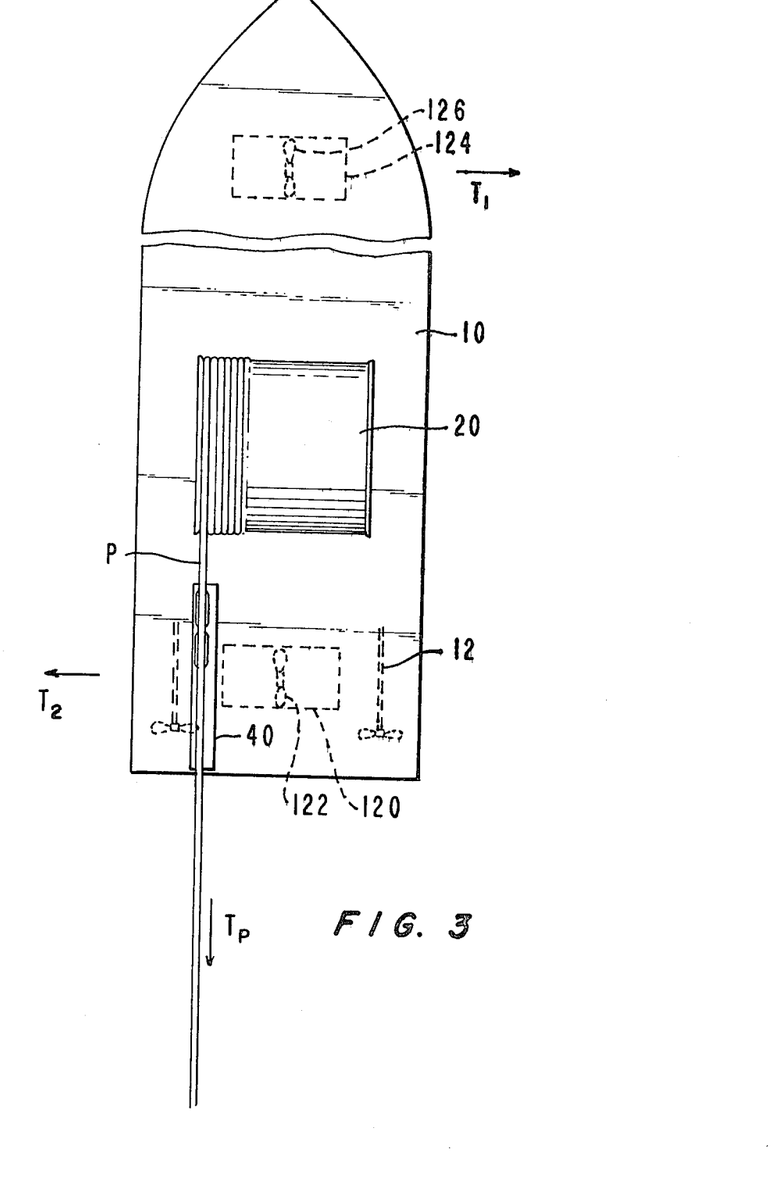
FIG. 3 is a diagrammatic plan view of the vessel showing course-correcting force relationships.

The thrusters 122 and 126 can be operated either manually or automatically in conjunction with, e.g., a computer operated guidance system, to generate turning moments which react against the pipeline induced turning moments. The pipeline introduces a turning moment about the intersection of the vessel longitudinal axis and reel shaft axis; the magnitude of the pipeline induced turning moment is a function of the tension on the pipeline and the pipeline offset from the vessel's centerline. The vessel thrusters generate turning moments about the aforesaid intersection of the vessel's centerline and reel shaft axis which react against the pipeline turning moment to maintain the vessel on its proper course.

Consideration must also be given to the fact that a turning moment occurs between the forward vessel thruster(s) and the pipeline touchdown point on the sea bottom. Therefore, in addition to rotating the vessel about the centerline intersection points, the entire vessel must be rotated about the touchdown point to maintain the vessel on and parallel to the right of way. This may be accomplished by increasing the thrust generated by the forward thruster(s) relative to the oppositely reacting force generated by the aft thruster(s).

The amount of thrust required varies as a function of a number of factors, including the lateral position of the pipeline relative to the vessel's longitudinal axis, the distance between the vessel and the touchdown point, the pipeline tension and pipe exit angle. In general, the forward thruster will be controlled to generate a thrust component $T_1$ in one lateral direction relative to the vessel's longitudinal centerline. The aft thruster will be controlled to generate a thrust component $T_2$ in the opposite lateral direction relative to the vessel's longitudinal centerline. Advantageously and preferably, $T_1$ is maintained greater than $T_2$; together, $T_1+T_2$ produce a turning moment which reacts the pipeline induced turning moment. The thrust generated by the forward thruster therefore comprises the additive components of the thrust necessary to react the pipeline induced turning moment about the vessel axis and the pipeline induced turning moment about the touchdown point pivot axis. The aft or rear thruster need only react the pipeline induced turning moment about the vessel axis. The forward thruster therefore imparts a relatively greater lateral thrust component than the rear thruster to overcome the pipeline induced turning moments about the vessel pivot axis and about the touchdown point pivot axis to thereby maintain the vessel on course along the right of way.

The invention may be embodied in other specific forms without departing from the spirit or essential characteristics thereof. The embodiment described above is therefore to be considered in all respects as illustrative and not restrictive, the scope of the invention being indicated by the hereafter appended claims rather than by the foregoing description, and all changes which come within the meaning and range of equivalency of the claims are therefore intended to be embraced therein.

What is claimed is:

1. A method of laying pipe offshore from a self-propelled reel pipe laying vessel, said vessel having self-propulsion means, a reel for spooling relatively inflexible pipe thereon, pipe handling means for straightening the pipe as it is unspooled and for guiding the straightened pipe into the water at a presettable adjustable pipe exit angle, and means for maintaining the pipe under a predetermined adjustable tension, said method comprising the steps of:

setting the pipe handling means to establish a desired pipe exit angle at which the pipeline substantially enters its catenary configuration before exiting the vessel and pipe handling means; and setting the tensioning means to hold the pipe under a predetermined nominal tension in conjunction with the pipe exit angle, to establish a minimum radius of curvature of the pipe in the sag bend region which is greater than the minimum radius to which that pipe may be bent without exceeding its elasticity limits as it is unspooled and paid out from the vessel.

2. A method according to claim 1, further comprising:
setting and maintaining a pipe exit angle and nominal pipeline tension to maintain the allowable working stress in the unsupported length of pipe between the vessel and sea bottom at less than the maximum working stress to which the pipe may be permissibly subjected.

3. A method according to claim 1, further comprising:
setting and maintaining a pipe exit angle and nominal pipeline tension to maintain the allowable working stress in the unsupported length of pipe between the vessel and the sea bottom at not greater than about 85% of the maximum working stress to which the pipe may be permissibly subjected.

4. A method according to claim 1, 2 or 3, further comprising:
setting the tensioning means to hold the pipe under the minimum tension required for a given exit angle to maintain the pipe within maximum allowable pipe stress limits and within maximum allowable residual tension limits for that pipe.

5. A method according to claim 1, 2 or 3, further comprising:
setting the pipe guide means to establish a desired pipe exit angle between about 20° and 60° relative to a nominal horizontal plane representing the water surface.

6. A method of laying pipe offshore from a self-propelled reel pipelaying vessel, said vessel having self-propulsion means, a reel for spooling relatively inflexible pipe thereon, pipe handling means for straightening the pipe as it is unspooled and for guiding the straightened pipe into the water at a presettable adjustable pipe entry angle, and means for maintaining the pipe under a predetermined adjustable tension, said method comprising the steps of:
monitoring the angle of entry of the pipe into the water relative to a nominal horizontal plane representing the water surface; and,
monitoring the angle of excursion which the pipe makes relative to a nominal pipe centerline substantially parallel to the nominal preset angle of entry into the water.

7. A method according to claim 6, further comprising:
adjusting the nominal pipeline tension if the monitored excursion angle remains outside a predetermined permissible excursion range for at least a significant time period greater than the pitching period of the vessel.

8. A method according to claim 6 or 7, further comprising:
increasing the nominal pipeline tension if the monitored excursion angle is less than the predetermined excursion range for at least said significant time period, and decreasing the nominal pipeline tension if the monitored excursion angle is greater than the predetermined permitted excursion range for at least said significant time period.

9. A method of laying pipe offshore from a self-propelled reel pipe laying vessel, said vessel having self-propulsion means, a reel for spooling relatively inflexible pipe thereon, pipe handling means for straightening the pipe as it is unspooled and for guiding the straightened pipe into the water at a presettable adjustable exit angle, means for maintaining the pipe under a predetermined adjustable tension, a pair of main vessel drive means located on opposite sides of the vessel longitudinal center-line, and forward and aft thruster means located forward and aft, respectively, of the longitudinal center of the vessel, said method comprising the steps of:
setting the pipe handling means to establish a desired pipe exit angle at which the pipeline substantially enters its catenary configuration before exiting the vessel and pipe handling means;
setting the tensioning means to hold the pipe under a predetermined nominal tension in conjunction with the pipe exit angle, to establish a minimum radius of curvature than the minimum radius to which that pipe may be bent without exceeding its elasticity limits as it is unspooled and paid out from the vessel;
translating the pipe handling means laterally across the beam of the vessel as pipe is unspooled from the reel; and,
compensating for pipeline tension induced turning moments by generating a reactive force in opposition to the pipeline tension induced turning moment to thereby correct for deviations in the vessel's course caused by said pipeline tension induced turning moment.

10. A method according to claim 9, further comprising:
generating said opposing reactive force by increasing the thrust generated by the main vessel drive on the same transverse side of the vessel as the pipe handling means and/or decreasing the thrust generated by the main vessel drive on the opposite transverse side of the vessel from the pipe handling means.

11. A method according to claim 9 or 10, further comprising:
generating a thrust $T_1$ in one substantially lateral direction with said forward thruster and generating a thrust $T_2$ in a substantially opposite lateral direction with said aft thruster, where $T_1$ is greater than $T_2$ and where $T_1$ plus $T_2$ produce a turning moment which at least substantially reacts the pipeline induced turning moment to thereby correct for said course deviations.

12. A method of laying pipe offshore from a self-propelled reel pipelaying vessel, said vessel having self propulsion means, a reel for spooling relatively inflexible pipe thereon, pipe handling means for straightening the pipe as it is unspooled and for guiding the straightened pipe into the water at a presettable adjustable pipe exit angle, and means for maintaining the pipe under a predetermined adjustable tension, said method comprising the steps of: setting the pipe handling means to establish the highest pipe exit angle at which the pipeline substantially enters its catenary configuration before exiting the vessel and pipe handling means, and setting the tensioning means to hold the pipe under the smallest nominal tension in the pipeline, in conjunction with the pipe exit angle, at which (a) the sag bend radius of the pipe remains above the minimum radius of curvature to which the pipe may be bent without exceeding its elasticity limits, (b) the maximum allowable stress limit of the pipe is not exceeded, and (c) the maximum allowable residual tension in the pipeline as laid is not exceeded.

13. A method according to claim 12, further comprising: setting and maintaining the allowable working stress in the unsupported length of pipe between the vessel and sea bottom at less than the maximum working stress to which the pipe may be permissibly subjected.

14. A method according to claim 12 or 13, further comprising: setting and maintaining a pipe exit angle and nominal pipeline tension to maintain the allowable working stress in the unsupported length of pipe between the vessel and the sea bottom at not greater than about 85% of the maximum working stress to which the pipe may be permissibly subjected.

15. A method according to claim 14, further comprising: setting the pipe handling means to establish a desired pipe exit angle between about 20° and 60° relative to a nominal horizontal plane representing the water surface.

* * * * *